US008764420B2

(12) United States Patent
Overmeier et al.

(10) Patent No.: US 8,764,420 B2
(45) Date of Patent: Jul. 1, 2014

(54) ECCENTRIC-SCREW PUMP WITH REPLACEABLE ROTOR AND STATOR

(75) Inventors: Dirk Overmeier, Oberhausen (DE); Marcel Griesdorn, Bottrop (DE); Vsevolod Ryvkin, Essen (DE)

(73) Assignee: seepex GmbH, Bottrop (DE)

( * ) Notice: Subject to any disclaimer, the term of this patent is extended or adjusted under 35 U.S.C. 154(b) by 321 days.

(21) Appl. No.: 13/227,789

(22) Filed: Sep. 8, 2011

(65) Prior Publication Data
US 2012/0063941 A1 Mar. 15, 2012

(30) Foreign Application Priority Data

Sep. 9, 2010 (DE) .......................... 10 2010 037 440

(51) Int. Cl.
*F01C 1/10* (2006.01)
*F03C 2/00* (2006.01)
*F03C 4/00* (2006.01)
*F04C 2/00* (2006.01)

(52) U.S. Cl.
USPC ............. 418/48; 418/152; 418/153; 464/161; 464/162; 403/368; 403/373; 403/374.4

(58) Field of Classification Search
CPC .. F04C 2/1073; F04C 2/1075; F04C 15/0061; F04C 15/0065; F04C 15/0073; F04C 15/0076; F04C 2230/60; F04C 2230/70; F04C 2240/20
USPC ................... 418/48, 152–153; 464/161–162; 403/368, 373, 374.4
See application file for complete search history.

(56) References Cited

U.S. PATENT DOCUMENTS

| | | | | |
|---|---|---|---|---|
| 3,512,904 A * | 5/1970 | Allen | .............. | 418/48 |
| 5,603,608 A * | 2/1997 | Marz | ................ | 418/48 |
| 6,227,829 B1 * | 5/2001 | Wehling et al. | ................. | 418/48 |
| 6,600,000 B1 * | 7/2003 | Ooura et al. | ................. | 526/344 |
| 7,473,082 B2 * | 1/2009 | Marielle | ......... | 418/48 |
| 8,439,659 B2 * | 5/2013 | Loeker et al. | .................. | 418/48 |
| 8,556,608 B2 * | 10/2013 | Sakakihara | ..................... | 418/48 |
| 2003/0003000 A1 * | 1/2003 | Shepherd et al. | .............. | 418/48 |
| 2008/0128534 A1 * | 6/2008 | McLeod | ....................... | 464/161 |
| 2010/0196182 A1 | 8/2010 | Loeker | | |

FOREIGN PATENT DOCUMENTS

| DE | 19943107 A | 4/2001 |
|---|---|---|
| DE | 202007013820 U | 12/2008 |
| DE | 102008021919 A | 11/2009 |

* cited by examiner

*Primary Examiner* — Theresa Trieu
(74) *Attorney, Agent, or Firm* — Andrew Wilford

(57) ABSTRACT

An eccentric-screw pump has an axially split stator having axially opposite intake and output ends and an elastomeric liner defining an axially throughgoing passage. Respective intake and output housings are releasably secured to the intake and output ends of the stator. An axially extending screw rotor in the passage has an end in the intake housing. A drive includes a rotatable universal joint having a pair of relatively swivelable parts in the intake housing. Respective generally complementary formations on the end of the rotor and on one of the universal-joint parts can fit axially together to rotationally couple the one universal-joint part with the rotor. A latch secures the formations axially together for angular force transmission between the one universal-joint part and the rotor.

13 Claims, 5 Drawing Sheets

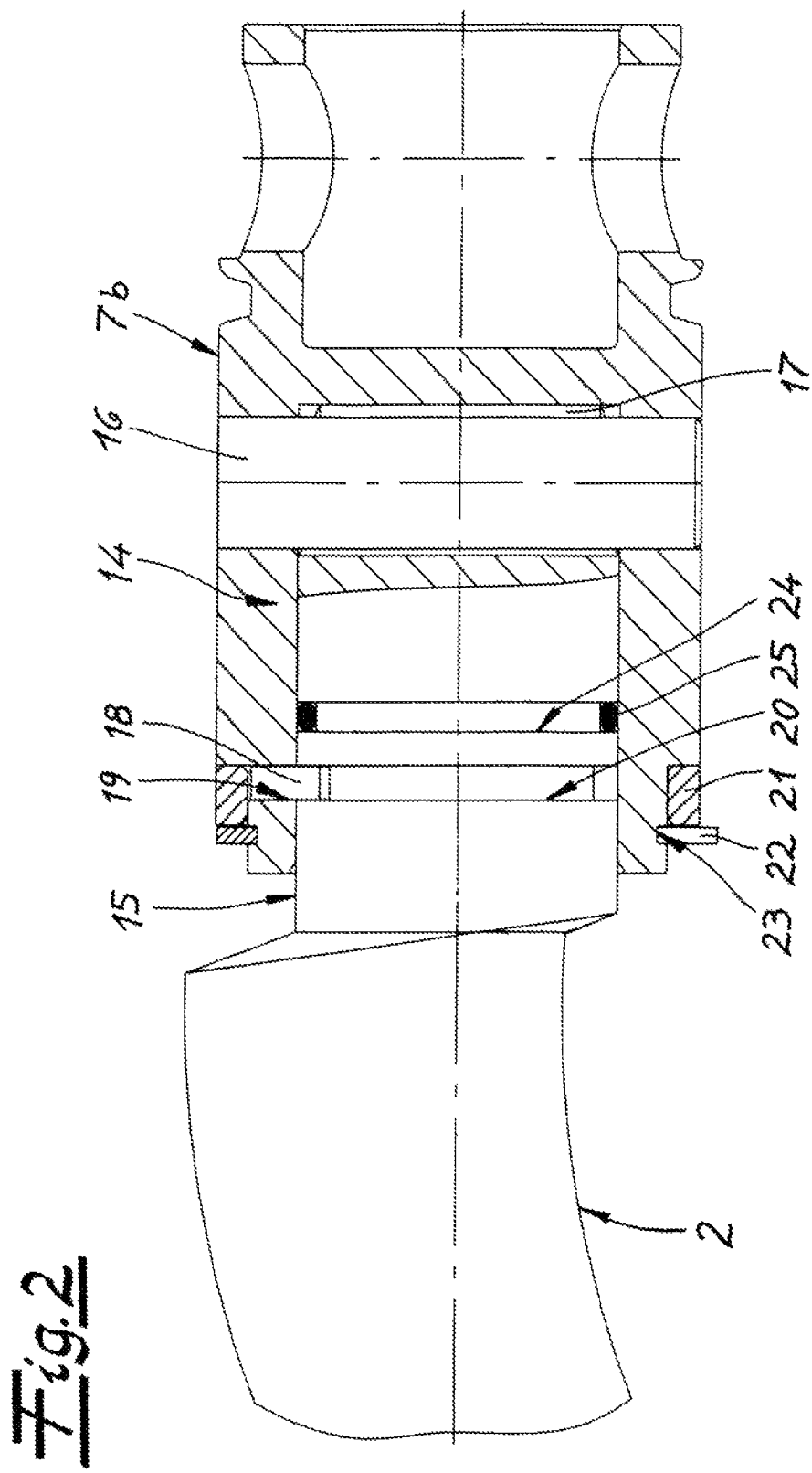

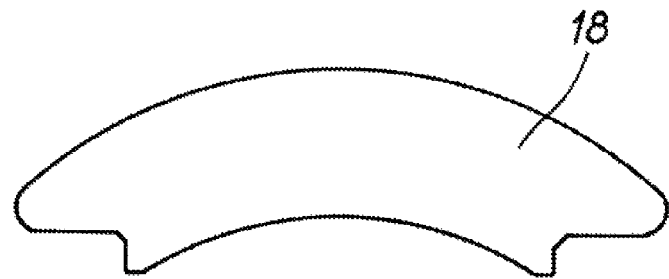
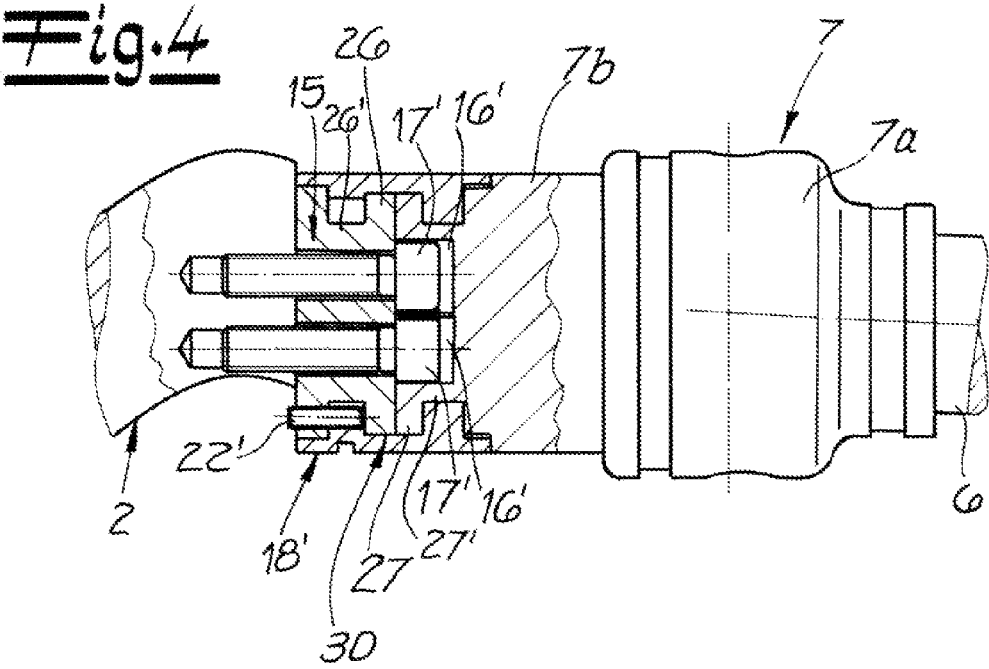

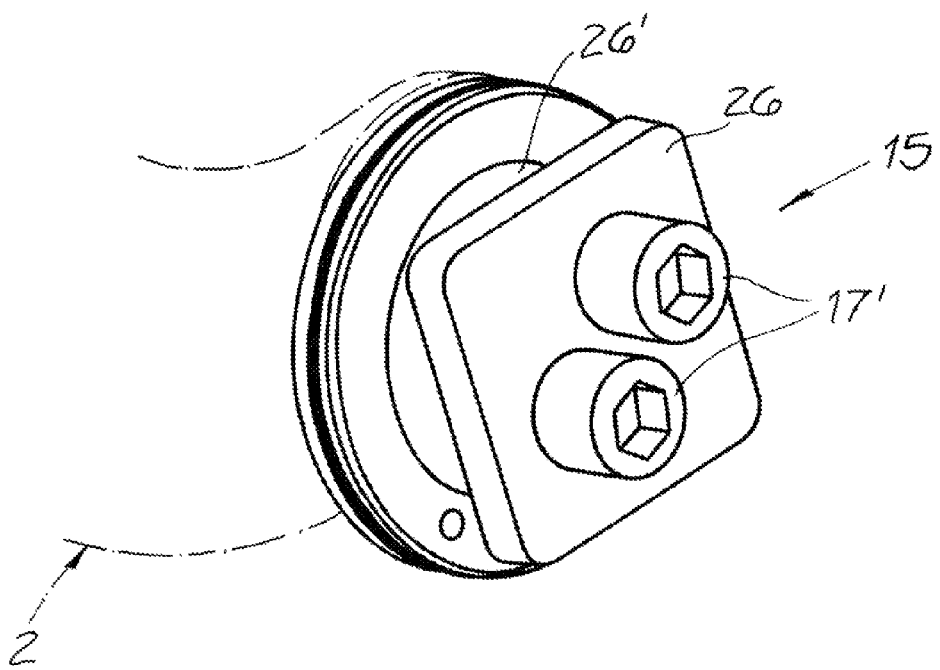
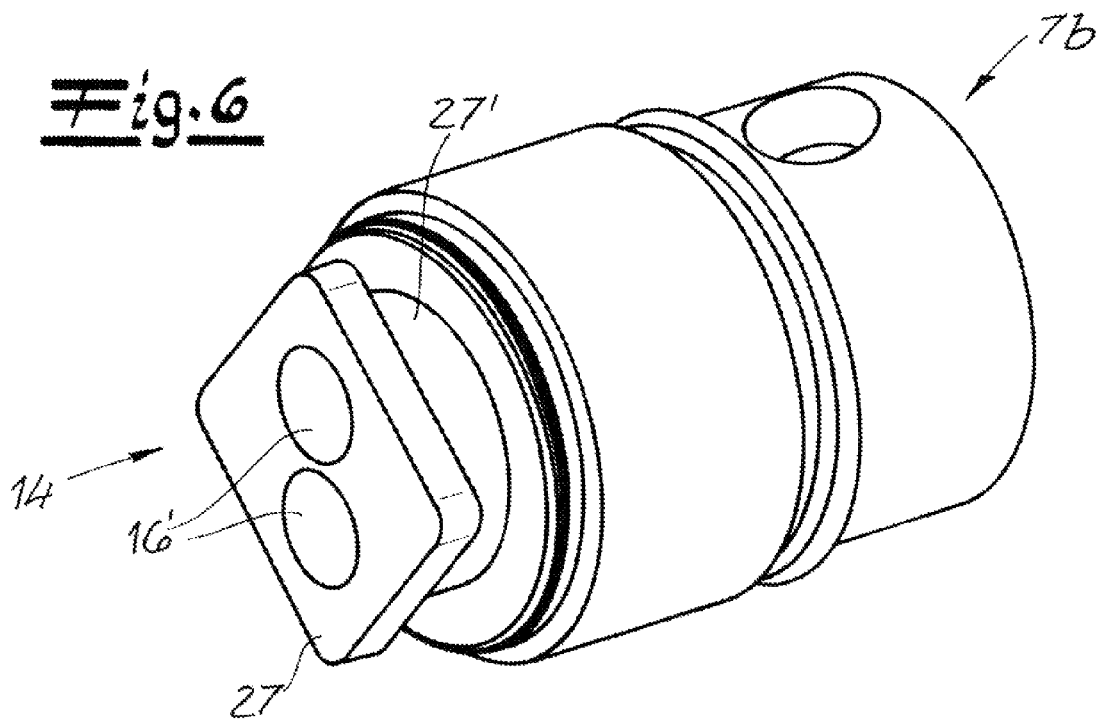

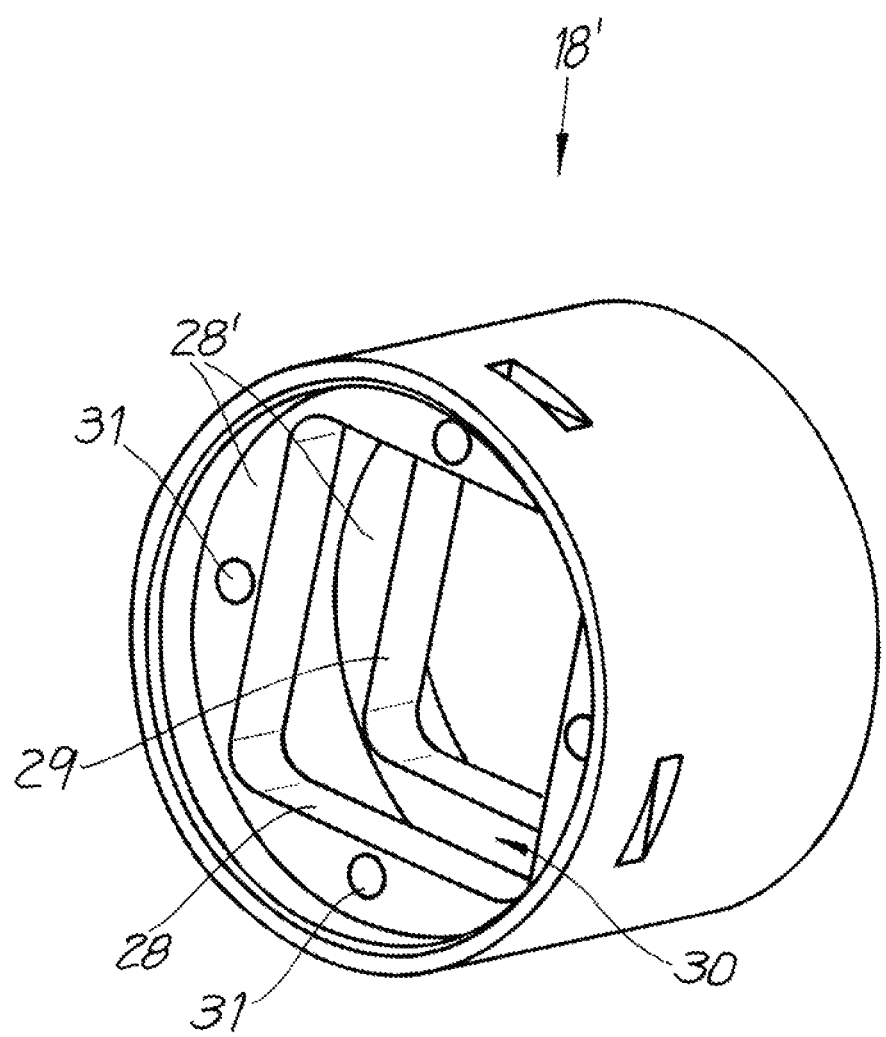

US 8,764,420 B2

ECCENTRIC-SCREW PUMP WITH REPLACEABLE ROTOR AND STATOR

FIELD OF THE INVENTION

The present invention relates to a pump. More particularly this invention concerns an eccentric-screw pump.

BACKGROUND OF THE INVENTION

An eccentric screw pump typically has at least one stator and one rotor rotatable in the stator. A suction housing is provided at one end of the stator and a connector at the axially opposite other end. The rotor is attached inside the suction housing to a coupling rod or drive shaft via a universal joint having an input-side first part and a rotor-side second part swivelable relative to the first joint part. The rotor is detachably connected to the second joint part of the joint.

The stator is normally made of an elastic material and is enclosed by a rigid stator casing, made for example of metal. According to the invention, the elastic material is an elastomer, for example a synthetic rubber or rubber mixture. The stator casing and elastically deformable stator are preferably separate parts.

During operation, the elastically deformable stator os subject to wear so that at regular intervals maintenance must be performed or the stator must be switched out. In order to exchange the stator that is installed between the suction housing and the connector element, in practice it has been necessary to uninstall the suction housing and/or connecting housing. Since an eccentric screw pump is frequently integrated into a system that has a plurality of other parts, as a rule such disassembly is a complex process. The same is true for exchanging the rotor.

In order to simplify replacement of the elastomer stator, it has already been suggested that the stator of an eccentric screw pump be longitudinally split so it has at least two stator parts. In this manner the elastically deformable stator may be exchanged without having to take the pump apart (see US 2010/0196182).

Alternatively, it was suggested that a spacer ring that can be removed for disassembling the stator be provided between the stator and connecting housing. This spacer ring can be uninstalled and removed with the connecting housing installed and with the stator installed so that after the spacer ring is uninstalled it is simple to change the stator, specifically without having to disassemble the suction housing and the connecting housing (see DE 10 2008 021 919). Here as well, the stator can be changed without uninstalling the rotor.

Finally, it has already been alternatively suggested that the suction housing be equipped with a removable housing segment in order thus to be able, after taking off the removable housing segment, to release the connection between the rotor and the coupling rod so that the stator can be removed with the rotor inside. In order to further simplify this option, it was further suggested that the rotor be detachably connected to the second joint part of the universal joint. Such an eccentric screw pump of this type is also known from DE 10 2008 021 919. A separable connection is provided between the second joint part and the rotor such that the universal joint does not itself have to be taken apart. The second joint part is consequently no longer an integral part of a conventional rotor, but rather is an independent part that is detachably connected to the actual rotor or section of a rotor. This system makes changing the stator much simpler.

In DE 199 43 107 an eccentric screw pump is described for emptying a silo where the pump is used in combination with a screw conveyor. For maintenance purposes, for example for rotor exchange and stator exchange, the eccentric screw pump must be separated from the adjacent screw conveyor. A closure element for sealing off the pump from the screw conveyor is described for this. Since it is no longer possible to separate the universal joint itself, it is suggested that the rotor be connected to the coupling shaft via an intermediate shaft, the intermediate shaft having a polygonal end facing the coupling shaft and the coupling shaft being provided on its end facing the intermediate shaft with a complementary polygonal socket for coupling to the shaft.

A similar embodiment is known from DE 20 2007 013 820 that describes an eccentric screw pump for viscous media in which additional conveyor elements or treatment elements are also provided.

OBJECTS OF THE INVENTION

It is therefore an object of the present invention to provide an improved eccentric-screw pump.

Another object is the provision of such an improved eccentric-screw pump that overcomes the above-given disadvantages, in particular that makes it possible in a manner that is cost-effective and technically simple with respect to assembly not only for changing the stator but especially also the rotor.

SUMMARY OF THE INVENTION

An eccentric-screw pump has according to the invention an axially split stator having axially opposite intake and output ends and an elastomeric liner defining an axially throughgoing passage. Respective intake and output housings are releasably secured to the intake and output ends of the stator. An axially extending screw rotor in the passage has an end in the intake housing. A drive includes a rotatable universal joint having a pair of relatively swivelable parts in the intake housing. Respective generally complementary formations on the end of the rotor and on one of the universal-joint parts can fit axially together to rotationally couple the one universal-joint part with the rotor. A latch secures the formations axially together for angular force transmission between the one universal-joint part and the rotor.

The invention initially proceeds from the recognition that the complexity of maintenance for an eccentric screw pump can be significantly reduced if the rotor of the eccentric screw pump can be exchanged in a simple manner without having to uninstall the intake or suction housing and the output or connecting housing. The invention consequently simplifies the stator exchange in an eccentric screw pump and provides more options with regard to the rotor exchange. However, for this rotor exchange it is no longer necessary to use a stator with a separate spacer ring and/or a suction housing with a removable housing segment. On the contrary, with the invention it is possible to exchange the rotor even with conventional housing arrangements. This is because, despite the limited amount of space in the area of the suction housing, in the invention a joint split is created in which the separable area may so to speak be removed axially from the suction housing. In addition, with this embodiment it is consequently not necessary to take apart the universal joint itself, but rather the joint is split between the second joint part and the rotor. However, this split or uninstalling may be accomplished without taking apart the suction housing the opening of the suction housing that faces the stator after the stator has been uninstalled. The invention thus may be realized especially in embodiments in which the stator is exchangeable without uninstalling the system. After the stator has been uninstalled, the rotor may then be uninstalled and changed, specifically without uninstalling the suction housing, since the elements to be uninstalled are all accessible axially and consequently are accessible via the open downstream end of the suction housing that is turned toward the stator.

The inventive idea is preferably used in eccentric screw pumps in which a stator exchange is done in a simple manner without uninstalling connecting housings and suction housing. The invention draws for instance on those embodiments that are known from US 2010/0196182. The elastically deformable stator lining is consequently provided within a rigid stator casing and may be exchanged separately therefrom. This means that the exchangeable, elastomeric stator lining is not attached to the stator casing, and especially is not glued or vulcanized thereto, but rather may be separated therefrom with nothing further for the purpose of the exchange. The stator is thus a longitudinally split stator. It comprises at least two stator parts. In a manner known per se, the stator or the parts of the stator may be attached to the connecting flange or flanges of the suction housing and/or connecting housings using one or a plurality of adapters that are bolted in both directions. Furthermore, it is advantageous when the stator casing is also a longitudinally split casing and has at least two, preferably at least three, for example four or more casing segments. With its casing segments the stator casing then forms a stator containment with which the elastomeric stator lining may be pressed radially against the rotor. The invention takes advantage of this technology, which permits simple exchange of the stator, and now additionally suggests the simple option for exchanging the rotor.

Particularly advantageous is the fact that the inventive principle is compatible with conventional eccentric screw pumps because the suction housing does not have to be modified. In particular it is not necessary to uninstall the suction housing and the suction housing also does not have to have a removable housing segment since—as explained in the foregoing— the joint split is axial, using the standard opening of the suction housing. This is because the second joint part of the universal joint inventively has a rotor socket that faces the rotor and is open on the rotor side and into which the rotor end is inserted axially, creating an angular force-transmitting connection. To this end a first coupling element is provided in the rotor socket and the rotor end has a second coupling element so that overall by inserting the rotor end into the rotor socket a coupling and thus an angular force-transmitting connection is created, the rotor end being inserted axially into the cup-shaped rotor socket and being secured axially therein. The rotor socket may also itself form the coupling element.

According to one embodiment, the coupling elements engage one another, forming a claw coupling. This may be created for instance in a simple and cost effective manner in that a diametral bolt is provided in the rotor socket as a coupling element and in that the rotor end has a fork as coupling element, the bolt during assembly engaging in the fork and creating the claw coupling. However, it is also within the invention that conversely the rotor end has the bolt and that the rotor socket has or is formed with the fork.

Above the invention was primarily described using the preferred embodiment in which the second joint part has a rotor socket that is open on the rotor side and into which the rotor end may be inserted axially, forming an angular force-transmitting connection. However, there is alternatively the option that it is not the rotor end that is inserted into an open socket of the second joint part, but rather that conversely the rotor end has an open socket into which the end of the second joint part is inserted. In this embodiment, the described coupling elements may also be provided in the described manner, forming the claw coupling.

The invention also includes modified embodiments in which the coupling elements do not form a claw coupling. Thus the coupling elements may engage for example forming a polygonal connection. This may be created for example in that the one coupling element is formed as a square or square pin that engages in a corresponding recess. Alternatively, however, the pins and the recesses may have a different shape and may be provided for example with outer and/or inner teeth. What is essential is the angular force-transmitting connection using the coupling elements.

Alternatively, one or a plurality of eccentrically provided, axially projecting pins may be provided on the rotor end as coupling elements and one or a plurality of corresponding eccentrically provided recesses may be provided on the second joint part, or vice versa. The projections and recesses may themselves have any desired cross-section and may also be formed for example cylindrically, since the rotation fast connection is provided via the eccentric positioning.

A securing element is provided in order to be able to fix the rotor end axially in a simple manner, it being possible to fix the rotor end with this securing element in the rotor socket. The securing element is formed for example as a latch element that can be installed radially and that when installed passes through a passage (for example a slit) in the rotor socket or its wall and engages in a recess (for example groove) on the outer circumference of the rotor end. Even when the joint split and joint connection are consequently realized essentially axially, in accordance with the invention this does not preclude the securing element from being installed radially for providing axial securing. However, the securing element may be formed as a relatively small securing plate that, despite the tight space, may be inserted into the suction housing in a simple manner and may be installed there at the desired location. This is because it is not necessary to produce the angular force-transmitting connection using this securing element, but rather the securing element is solely for axial securing. This embodiment is further optimized in that the securing element that may be installed for example radially is secured with a support ring that can be placed axially onto the rotor socket. This support ring may then itself be axially arrested with arresting means, for example a snap ring or the like.

The embodiment with securing element, support ring, and/or arresting means or snap ring may also be created in the same manner in embodiments in which it is not the rotor end that is inserted into an open socket of the second joint part, but rather conversely the second joint part is inserted into an open socket of the rotor end. In this case the wall of the socket of the rotor end preferably has a passage through which the securing element, for example securing plate, is passed, this securing element then engaging in a recess on the outer circumference of the joint end. The support ring is then consequently placed onto the socket of the rotor end.

Alternatively, the axial securing may also be realized in another manner. Thus there is the option for the rotor end to have a (flange-like) first securing plate and the second joint part to have a (flange-like) second securing plate. The plates are connected axially to one another by a rotatable securing sleeve that can be placed on them. This embodiment is particularly well suited in the described embodiments with eccentric coupling elements. In this case it is useful when the eccentric coupling elements are provided on the first plate or on the second plate. Consequently, during assembly the first plate and the second plate are pressed against one another such that the pins engage in the recesses and thus create the angular force-transmitting connection. The securing sleeve that has already been placed thereon may then be rotated about a predetermined angle, for example 45° when the plates are rectangular, such that the sleeve then axial secures together the two plates. It is within the context of the invention that the securing sleeve is then arrested against twisting using an arresting means.

Overall it is within the context of the invention that there is the option of joint separation combined with axial securing. This axial securing makes it possible for the pump to be operated in both rotational directions despite the joint split.

BRIEF DESCRIPTION OF THE DRAWING

The above and other objects, features, and advantages will become more readily apparent from the following description, reference being made to the accompanying drawing in which:

FIG. 2 is a large-scale view of the rotor-end assembly of FIG. 1;

FIG. 3 is a detail view of the securing plate for the assembly shown in FIG. 2;

FIG. 4 is a partly sectional view through another rotor-end assembly for the inventive eccentric screw pump;

FIG. 5 is a perspective view from outside of a part of the rotor assembly shown in FIG. 4;

FIG. 6 is a perspective view from inside of another part of the rotor assembly shown in FIG. 4; and FIG. 7 is a perspective view of the securing sleeve for the assembly of FIG. 4.

DETAILED DESCRIPTION

Figure 1:
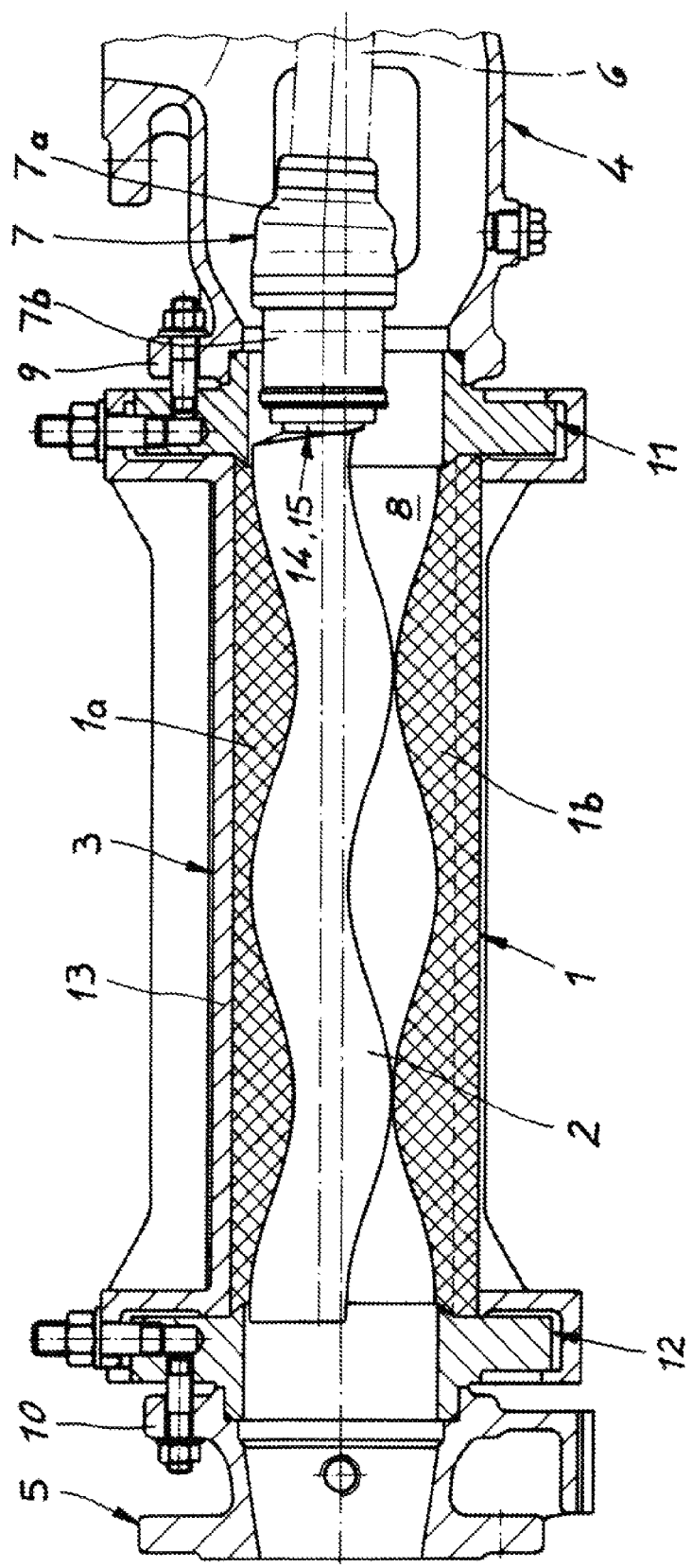
FIG. 1 is a simplified longitudinal section through an inventive eccentric screw pump.

As seen in FIG. 1 an eccentric screw pump basically comprises a generally tubular stator 1 made of elastomeric material and a rotor 2 extending axially in an axially throughgoing passage of an elastomeric liner forming the stator 1. The stator 1 is held in a tubular, rigid, and stationary casing 3. The stator 1 is thus elastically deformable while the stator casing 3 is rigid and made of metal. The stator 1 and casing 3 can be separated from each other.

The pump furthermore has an intake or suction housing 4 and a connecting housing 5 that is an output or pressure connector. A drive effective on the rotor 2 has a partly shown coupling rod 6 that is connected to the rotor 2 via a universal joint 7. At its opposite end it is connected via another such (unillustrated) universal coupling to an unillustrated drive motor.

The stator 1 is bolted at its one intake end to a connecting flange 9 of the suction housing 4 and at its opposite output end to a connecting flange 10 of the connecting housing 5. In the illustrated embodiment, the connection is not directly to these connecting flanges 9 and 10, but rather with adapter rings 11 and 12 at each end. These adapters 11 and 12 serve as centering rings. In the illustrated embodiment, the stator 1 is longitudinally split and has two parts 1a and 1b. The longitudinally split embodiment of the stator makes it possible to uninstall and install the stator 1 with the suction housing 4, pressure connector 5 and rotor 2 installed, since after the pressure connector 5 is removed from one end the stator 1 does not have to be placed on the rotor 2. The stator casing 3 is longitudinally split. To this end it has a plurality of segments 13 that together form a stator clamping apparatus or stator adjusting apparatus that can be used to fix and seal the longitudinally split stator 1 and that also allows the stator 1 to be pretensioned or precompressed. See above-cited US 2010/0196182, which is herewith incorporated by reference, for details about the longitudinally split stator and casing.

In accordance with the invention, now not only is the stator 1 exchangeable, but the rotor 2 is also. This may be seen in particular in FIG. 2 that shows a portion of the eccentric screw pump at the universal joint 7 between the rotor 2 and the coupling rod 6. This universal joint 7 comprises in a manner known per se an input-side joint part 7a and an output- or rotor-side second joint part 7b that can swivel on the first part 7a. The rotor 2 is according to the invention detachably connected to the second part 7b of the universal joint 7. This joint 7 is created in the illustrated embodiment in that the second part 7b has a rotor socket 14 that is open axially toward the rotor 2. A cylindrical end 15 of the rotor 2 can be inserted axially into this rotor socket 14, creating an angular force-transmitting connection. Thus the rotor 2 may be separated from the universal joint 7 to change the rotor without it being necessary to take apart the suction housing 4 or open it in some other manner. This shall now be explained in greater detail in the following.

In the embodiment according to FIGS. 1-3, the cup-shaped rotor socket 14 holds a coupling element 16 that is a diametrally extending bolt in the illustrated embodiment. The rotor end 15 is formed with a second coupling element 17 that is an axially open fork in the illustrated embodiment. The coupling elements 16 and 17 thus interengage on installation, forming a claw coupling, so that an angular force-transmitting connection is created between rotor 2 and universal joint 7. However, the rotor end 15 in the rotor socket 14 is installed and uninstalled essentially axially, because the rotor end 15 is inserted axially into the rotor socket 14. It is merely necessary for the rotor end 15 then to be fixed axially in the rotor socket with a securing element 18. This securing element 18 is shown in FIG. 3. In the illustrated embodiment it is a crescent-shaped plate 18 that when installed extends through a secantal passage 19 in the rotor socket 14 or its wall and engages in a groove 20 on the outer surface of the rotor end 15. Even if this securing plate 18 is basically inserted essentially radially into the slit 19 or the groove 20 for axial securing, this installation can be performed with nothing on the upstream side of the intake housing 4 that faces the rotor 2 or the stator 1 so that overall it is possible to exchange the rotor with the suction housing installed, specifically after the stator 1 has been removed.

The securing plate 18 does not have to create the actual angular force-transmitting and coupling connection. Instead it merely provides axial securing. The actual coupling and angular force-transmitting connection is the job of the coupling elements 16 and 17, that is of the bolt 16 and the fork 17. The securing element 18 is held in place by a retaining ring 21 that can be axially fitted to the rotor socket 14 to radially inwardly engage the securing element 18. The support ring 21 may then itself be arrested axially using a snap ring 22 or the like.

Thus according to the invention, to change the rotor, first the stator 1 is removed without it being necessary to uninstall the pressure connector 5 and/or the suction housing 4 because in the illustrated embodiment the stator 1 is split. Thus the downstream end of the suction housing 4 is accessible once the stator has been removed. Now the joint may be separated in the manner described so that the rotor may then be exchanged. Another outwardly open circumference groove 23 is formed on the outside of the rotor socket 14 for the snap ring 22. In addition it can be seen that, in addition to the already mentioned groove 20 for the securing plate, the rotor end 15 has another groove 24 into which for instance a seal ring 25 may be fitted.

FIGS. 1 through 3 show a preferred embodiment in which the cup-shaped socket 14 is provided on the second part 7b such that the rotor end 15 is inserted into this open rotor socket 14.

Alternatively, however, an open socket may also be provided on the rotor end 15 such that the end of the second part 7b may then be inserted into the open socket of the rotor end 15. The figures do not show such an embodiment.

A modified embodiment of the invention is explained using FIGS. 4 through 7. FIG. 4 shows the joint assembly of the eccentric screw pump. The rotor end 15 and the universal joint 7 with the second part 7b can be seen. Here, as well, a detachable angular force-transmitting coupling is created between the rotor 2 and the second part 7b.

To this end two eccentric axially projecting and cylindrical pins 17' are provided on the rotor end 15 as coupling elements and two complementary eccentric recesses 16' are formed on the second part 7b (or vice versa). In order to create the desired angular force-transmitting connection, during installation the pins 17' are fitted into the recesses 16'. Angular force transmission is ensured by their eccentric positioning, that is neither lies on the rotation axis of the rotor 2. In the embodiment shown in FIGS. 4 through 7, a flange-like first plate 26 is provided on the rotor end and a flange-like second plate 27 is provided on the second part. The recesses 16' and the projections 17' are provided on these plates 26 and 27. They are spaced from the rotor end 15 or the part 7b by cylindrical neck regions 26' and 27' of reduced diameter. The plates 26 and 27 themselves have an outer shape that is not circular, for example polygonal. In the illustrated embodiment they are square or rectangular.

Axial securing is provided by a sleeve 18' that is placed over them and rotated. This securing sleeve 18' is shown in detail in FIG. 7 and its functioning may be seen by comparing FIGS. 4 through 7. It can be seen that the sleeve 18' has walls 28' formed with square holes 28 and 29 through which the plates 26 and 27 may pass. The separating walls 28' are separated by an intermediate space 30 and when installed the plates 26 and 27 fit in and fill this space 30. The plates 26 and 27 may then be axially fixed to one another by rotating the sleeve 18', for example 45°. This rotation may be fixed by an additional latch element 22' that may be passed through holes 31 provided in the walls 28' of the sleeve 18'. Overall a quick-release coupling is created in this illustrated embodiment.

It is also within the scope of the invention to make the plates 26 and 27 unitary with the rotor 2 and the part 7b. However, it is particularly preferred when at least the plate 26 is an adapter piece detachably connected to the rotor 2. This may be seen in FIG. 4.

We claim:

1. An eccentric-screw pump comprising:
   an axially split stator having axially opposite intake and output ends and an elastomeric liner defining an axially throughgoing passage;
   respective intake and output housings;
   means releasably securing the intake and output housings to the intake and output ends of the stator;
   an axially extending screw rotor in the passage and having an end in the intake housing;
   a drive including a universal joint having a pair of relatively swivelable parts in the intake housing;
   respective generally complementary formations on the end of the rotor and on one of the universal-joint parts fittable axially together to rotationally couple the one universal-joint part with the rotor; and
   latch means for securing the formations axially together for angular force transmission between the one universal-joint part and the rotor.

2. The eccentric-screw pump defined in claim 1, wherein one of the formations is an axially open socket and the other of the formations is axially fittable in the socket.

3. The eccentric-screw pump defined in claim 2, wherein the parts together form a claw coupling.

4. The eccentric-screw pump defined in claim 2, wherein the other of the formations is a fork and the socket is provided with a diametral bolt fittable with the fork.

5. The eccentric-screw pump defined in claim 2, wherein the other of the formations is a pair of eccentric and axially extending projections and the socket is formed by a complementary pair of eccentric and axially oppositely extending recesses.

6. The eccentric-screw pump defined in claim 2, wherein the other of the formations has a radially outwardly open and axially closed recess and the socket is formed with a throughgoing hole alignable therewith, the latch means including a latch element engageable through the hole into the recess to axially lock the other formation in the socket.

7. The eccentric-screw pump defined in claim 6 wherein the hole extends secantally past the recess.

8. The eccentric-screw pump defined in claim 6, wherein the latch means further includes a retaining ring fittable over the latch element and around the formations and, when fitted over the latch element, retaining the latch element in the recess.

9. The eccentric-screw pump defined in claim 8, wherein the retaining ring further comprises a snap ring fittable to the other formation to hold the retaining ring in position over the latch element.

10. The eccentric-screw pump defined in claim 1 wherein the formations include a pair of polygonal plates carried on the one universal-joint part and axially engageable when the formations are axially interfitted, the latch means including:
    a sleeve fittable axially over both of the formations and having a pair of axially spaced walls formed with angularly relative fixed polygonal holes through into which the polygonal plates are engageable, the plates being fittable between the walls when juxtaposed such that rotation of the sleeve relative to the plates is possible to a locking position in which the plates are axially captured between the walls, and
    a latch element axially engageable between the sleeve and one of the formations to angularly retain the sleeve in the locking position.

11. The eccentric-screw pump defined in claim 10 wherein the one universal-joint part and the rotor end are each formed with a small-diameter neck region having an outer end carrying the respective plate.

12. The eccentric-screw pump defined in claim 1 wherein the formations are complementarily polygonal.

13. The eccentric-screw pump defined in claim 1 wherein the stator has a plurality of axially extending and separable casing parts fixable between the housings and carrying the liner.

* * * * *